(12) United States Patent
Iyasere et al.

(10) Patent No.: US 9,635,809 B2
(45) Date of Patent: May 2, 2017

(54) ELECTRONIC CONTROL FOR A GRASS CUTTING REEL ASSEMBLY OF A LAWN-CARE VEHICLE

(71) Applicant: Textron, Inc., Providence, RI (US)

(72) Inventors: Erhun Osahenrhunwen Iyasere, Charlotte, NC (US); Robert James Pilon, Jr., Huntersville, NC (US); Richard Michael Krzesicki, Charlotte, NC (US)

(73) Assignee: Textron Inc., Providence, RI (US)

( * ) Notice: Subject to any disclaimer, the term of this patent is extended or adjusted under 35 U.S.C. 154(b) by 86 days.

(21) Appl. No.: 14/300,571

(22) Filed: Jun. 10, 2014

(65) Prior Publication Data

US 2015/0351318 A1 Dec. 10, 2015

(51) Int. Cl.
*A01D 34/54* (2006.01)
*A01D 34/00* (2006.01)
*A01D 34/56* (2006.01)
*A01D 34/44* (2006.01)

(52) U.S. Cl.
CPC ........... *A01D 34/54* (2013.01); *A01D 34/006* (2013.01); *A01D 34/56* (2013.01); *A01D 34/44* (2013.01)

(58) Field of Classification Search
CPC .... A01D 34/008; A01D 34/54; A01D 34/006; A01D 34/44; A01D 34/53; A01D 34/74; A01D 34/56
See application file for complete search history.

(56) References Cited

U.S. PATENT DOCUMENTS

| 1,167,400 | A | * | 1/1916 | Gobiet | B60S 1/68 172/547 |
|---|---|---|---|---|---|
| 2,332,892 | A | * | 10/1943 | Clemson | A01D 34/42 56/253 |
| 2,915,318 | A | * | 12/1959 | Chesser | A01D 34/74 280/43 |
| 3,269,100 | A | * | 8/1966 | Smith | A01D 34/74 56/17.2 |
| 3,334,911 | A | * | 8/1967 | Enters | A01D 34/74 16/19 |
| 3,594,016 | A | * | 7/1971 | Wells | A01D 34/54 280/43.17 |
| 4,021,996 | A | * | 5/1977 | Bartlett | A01D 75/306 56/17.2 |
| 4,368,609 | A | | 1/1983 | Hutchinson et al. | |

(Continued)

*Primary Examiner* — Alicia Torres
*Assistant Examiner* — Adam Behrens
(74) *Attorney, Agent, or Firm* — Polster Lieder

(57) ABSTRACT

A system for controlling a grass cutting reel assembly of a turf-care vehicle. The system includes: a reel cylinder motor operable to rotate a reel cylinder of a grass cutting reel assembly of a turf-care vehicle at a desired rotational rate of speed to provide a controllable frequency of clip for the reel assembly; an automated height of cut control system operable to control a position of a front roller of the reel assembly to provide a controllable height of cut for the reel assembly; and a controller system operable to control the reel cylinder motor and the height of cut control system to provide a particular frequency of clip and a particular height of cut stipulated by one of a plurality of cutting scenarios programmed into the controller system and selected via a user interface of the controller system that is accessible by an operator onboard the turf-care vehicle.

19 Claims, 6 Drawing Sheets

(56) References Cited

U.S. PATENT DOCUMENTS

| | | | | |
|---|---|---|---|---|
| 4,481,757 A * | 11/1984 | Tsuchiya | A01D 34/42 | 56/16.9 |
| 4,840,020 A * | 6/1989 | Oka | A01D 34/63 | 172/395 |
| 4,947,630 A * | 8/1990 | Rich | A01D 34/62 | 56/249 |
| 5,197,267 A * | 3/1993 | Aldred | A01D 34/54 | 56/17.1 |
| 5,209,050 A * | 5/1993 | Carrigan | A01D 34/003 | 172/608 |
| 5,230,208 A * | 7/1993 | Hess | A01D 34/74 | 172/395 |
| 5,363,633 A * | 11/1994 | Masaru | A01D 34/54 | 172/407 |
| 5,394,678 A * | 3/1995 | Lonn | A01D 34/475 | 56/10.2 H |
| RE34,946 E | 5/1995 | Weaver et al. | | |
| 5,661,959 A * | 9/1997 | Vargas | A01D 34/003 | 404/129 |
| 6,109,009 A * | 8/2000 | Benson | A01D 34/006 | 56/10.2 G |
| 6,230,089 B1 * | 5/2001 | Lonn | A01D 34/475 | 701/34.3 |
| 6,334,630 B1 * | 1/2002 | Barros, Sr. | A01B 71/08 | 15/256.5 |
| 6,487,837 B1 * | 12/2002 | Fillman | A01D 34/58 | 56/11.9 |
| 6,609,356 B2 * | 8/2003 | Fackrell | A01D 75/30 | 56/233 |
| 6,732,500 B1 * | 5/2004 | Myers | A01D 34/54 | 56/17.2 |
| 6,892,517 B2 * | 5/2005 | Adams | A01D 34/78 | 56/10.2 R |
| 7,114,318 B2 * | 10/2006 | Poulson | A01D 34/54 | 56/249 |
| 7,540,135 B2 * | 6/2009 | Strope | A01D 34/74 | 56/14.9 |
| 7,614,207 B2 * | 11/2009 | Elhardt | A01D 34/74 | 56/17.1 |
| 7,624,560 B1 * | 12/2009 | Humphrey | A01D 34/54 | 56/17.2 |
| 7,775,025 B1 * | 8/2010 | Coffin | A01D 34/54 | 56/249 |
| 7,788,892 B2 * | 9/2010 | Schmidt | A01D 34/54 | 56/249 |
| 8,225,587 B2 * | 7/2012 | Wilson | A01B 45/026 | 56/249 |
| 8,347,593 B2 * | 1/2013 | Ito | A01D 34/74 | 56/17.2 |
| 8,621,833 B2 * | 1/2014 | Shida | A01D 34/44 | 180/165 |
| 8,635,962 B2 * | 1/2014 | Schilling | A01C 7/203 | 111/134 |
| 8,839,598 B2 * | 9/2014 | Shida | A01D 34/44 | 56/17.1 |
| 9,021,776 B2 * | 5/2015 | Zwieg | A01D 34/64 | 56/17.1 |
| 2003/0110752 A1 * | 6/2003 | Dow | A01D 89/00 | 56/364 |
| 2003/0140611 A1 * | 7/2003 | Burke | A01D 34/54 | 56/17.2 |
| 2004/0216436 A1 * | 11/2004 | Schmidt | A01D 34/53 | 56/5 |
| 2004/0216438 A1 * | 11/2004 | Poulson | A01D 34/54 | 56/17.1 |
| 2005/0257508 A1 * | 11/2005 | Modzik | A01D 34/44 | 56/7 |
| 2007/0007200 A1 * | 1/2007 | Slater | A01D 34/54 | 210/602 |
| 2007/0107404 A1 * | 5/2007 | Hickenbottom | A01D 34/54 | 56/17.2 |
| 2007/0234697 A1 * | 10/2007 | Silbemagel | A01D 34/54 | 56/249 |
| 2007/0234698 A1 * | 10/2007 | Silbernagel | A01D 34/54 | 56/249 |
| 2009/0188225 A1 * | 7/2009 | Harris | A01D 34/475 | 56/10.2 H |
| 2010/0313538 A1 * | 12/2010 | Coleman | A01B 29/06 | 56/16.7 |
| 2014/0331630 A1 * | 11/2014 | Phillips | A01D 34/006 | 56/10.2 H |

* cited by examiner

ELECTRONIC CONTROL FOR A GRASS CUTTING REEL ASSEMBLY OF A LAWN-CARE VEHICLE

FIELD

The present teachings relate to grass cutting reel assemblies for turf-care vehicles, and more particularly to an electronic control for controlling a frequency of clip and a height of cut of such reel assemblies.

BACKGROUND

The statements in this section merely provide background information related to the present disclosure and may not constitute prior art.

Commercial turf-care vehicles typically used for cutting, grooming and maintaining grass at golf courses, sporting venues, parks, etc., often include one or more grass cutting reel assemblies. Each reel assembly includes a reel cylinder that comprises a plurality of cutting blades helically disposed about a shaft that is rotationally mounted within a reel cylinder frame of the reel assembly. Each reel assembly additionally includes a bedknife assembly that is fixedly mounted to the reel cylinder frame and includes a bedknife blade with which the cutting blades of the reel cylinder contact to cut grass as the turf-care vehicle traverses the ground. In many instances, a motor, e.g., an electric or hydraulic motor, is mounted to the reel cylinder frame and operably connected to the reel cylinder shaft to drive the reel cylinder and cutting blades during grass cutting operation of the respective vehicle. Additionally, such reel assemblies typically include a front roller rotationally disposed within a front roller frame that is pivotally mounted to the reel cylinder frame such that a position of the front roller, relative to the reel cylinder, can be manually adjusted to set a height at which the grass is cut.

The frequency-of-clip (FoC) of a reel assembly for such turf-care vehicles refers to the distance the reel assembly travels before the next swath of grass is cut (i.e. the forward distance traveled between successive blade to bedknife contacts). With reference to golf course turf-care vehicles, the FoC generally determines the speed at which a golf ball will roll relative to a given cut grass surface (i.e., greens, collars, tee-boxes, approaches, fairways, etc.). It is therefore imperative that the FoC be selectably variable. At least some turf-care vehicle manufacturers have addressed the issue of selectably controlling the FoC by designing and manufacturing hybrid reel mowers that are structured and operable to independently control the traction speed (i.e., the speed at which the vehicle is driven forward) and the rotational speed of the reel cylinder. However, in such vehicles, the desired FoC must be manually adjusted, or reset, whenever the operator transitions from one cutting scenario to another (e.g. from greens to collars to tee-boxes, etc.).

The height-of-cut of a reel assembly (HoC) refers to the vertical (or orthogonal) distance between the top of the tip of the bedknife blade and a ground surface plane formed between the bottom of the front and rear rollers of the reel assembly. HoC determines the mowing height of the respective reel assembly (i.e., the height at which the grass is cut). Similar to the FoC, the HoC differs depending on the type of surface to be cut, with greens usually having the lowest HoC and roughs having the highest. Typically to set or adjust the HoC, a one or two point manual adjustment system is implemented to adjust the position of the front roller frame relative to the reel cylinder frame. Such manual adjustment is time consuming and must be repeated whenever the surface requiring maintenance changes (e.g. going from cutting a green to cutting the collar). In many instances, to reduce such set-up time, facilities tend to own one vehicle with multiple sets of reel assemblies set at different heights, or own multiple vehicles configured with reel assemblies set at different heights, both of which are very expensive.

SUMMARY

In various embodiments, the present disclosure provides a control system for a grass cutting reel assembly of a turf-care vehicle. The system includes a reel cylinder motor that is structured and operable to rotate a reel cylinder of a grass cutting reel assembly of a turf-care vehicle at a desired rotational rate of speed to provide a controllable frequency of clip for the reel assembly. The system additionally includes an automated height of cut control system that structured and operable to control a position of a front roller of the grass cutting reel assembly to provide a controllable height of cut for the reel assembly. Furthermore, the system includes a controller system structured and operable to control the reel cylinder motor and the height of cut control system to provide a particular frequency of clip and a particular height of cut stipulated by one of a plurality of cutting scenarios programmed into the controller system and selected via a user interface of the controller system that is accessible by an operator onboard the turf-care vehicle.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
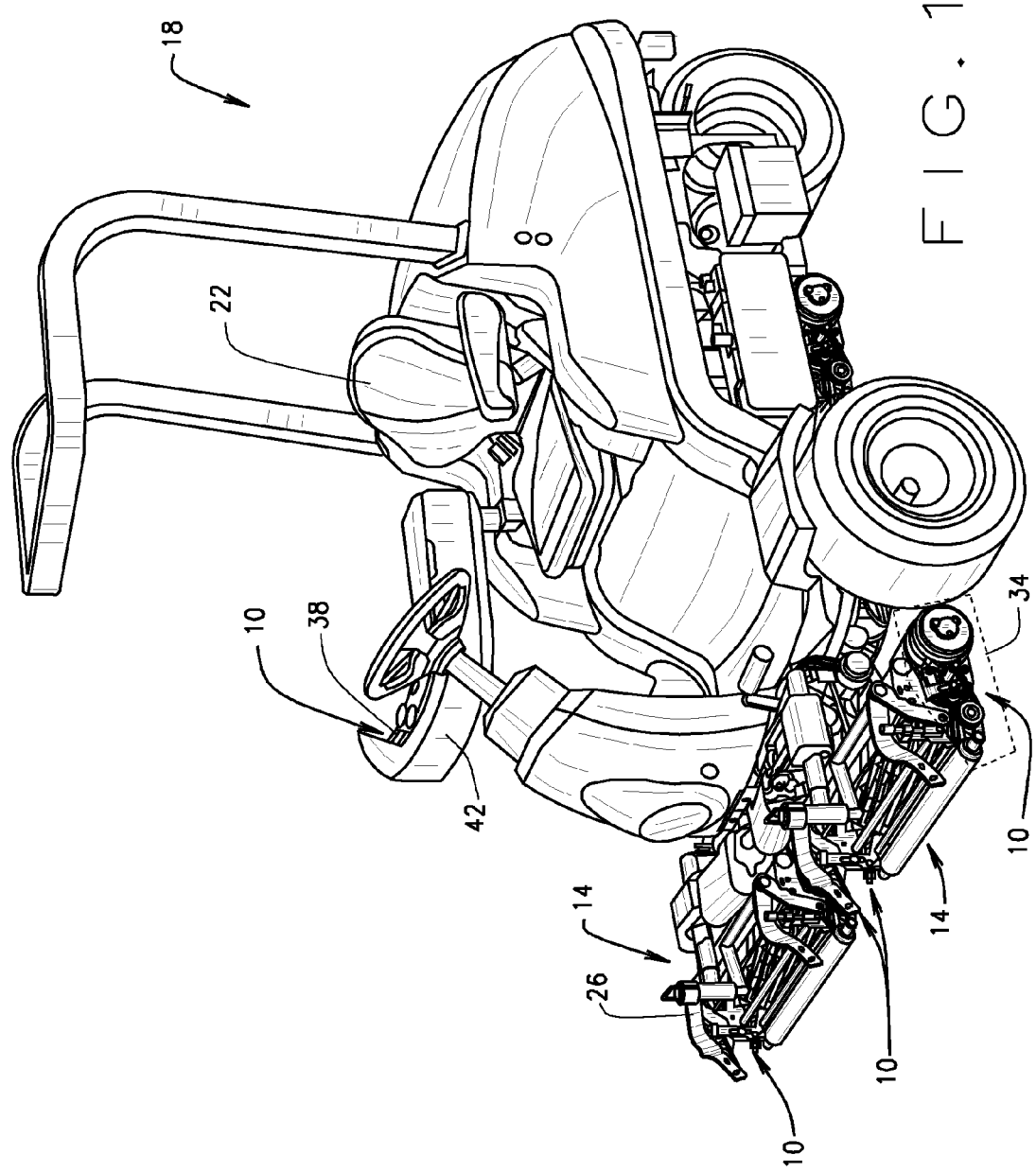
FIG. 1 is an exemplary illustration of a turf-care vehicle comprising a frequency of clip and height of cut control system, in accordance with various embodiments of the present disclosure.
Figure 2:
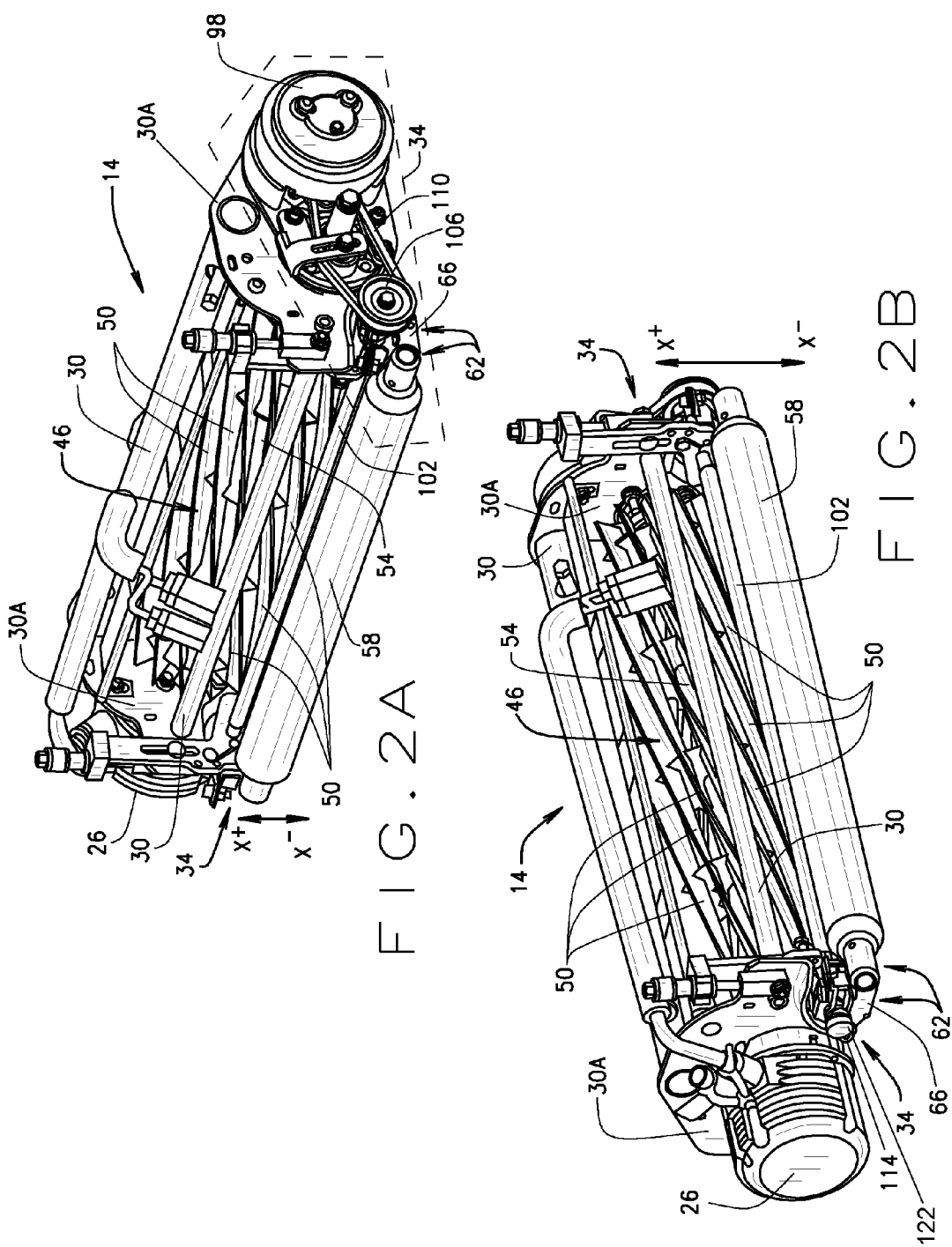
FIG. 2A is an isometric left-side view of a grass cutting reel assembly of the turf-care vehicle comprising a reel motor and an automated height of cut control system of the frequency of clip and height of cut control system, shown in FIG. 1, in accordance with various embodiments of the present disclosure.
FIG. 2B is an isometric right-side view of the grass cutting reel assembly shown in FIG. 2A, in accordance with various embodiments of the present disclosure.
Figure 3:
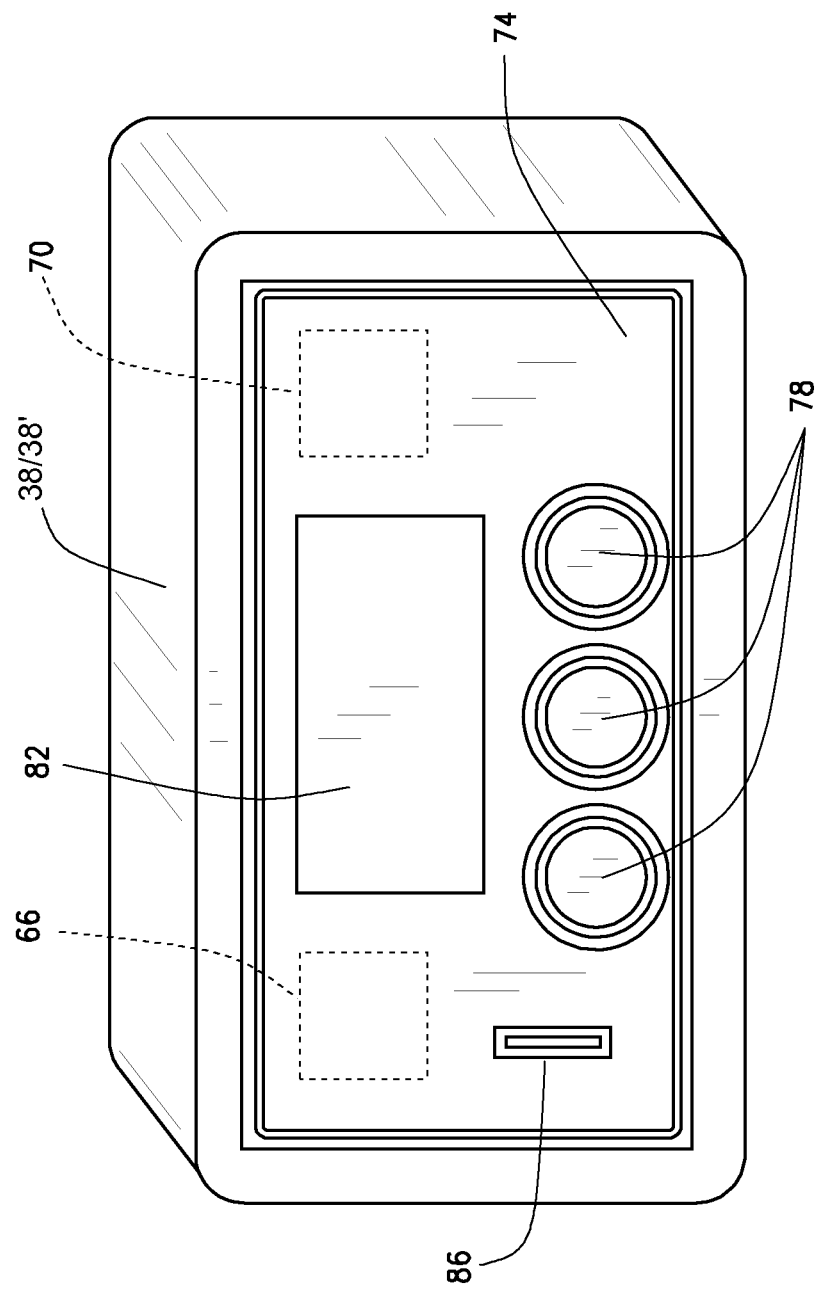
FIG. 3 is an exemplary illustration of a controller system and user interface of the frequency of clip and height of cut control system shown in FIG. 1, in accordance with various embodiments of the present disclosure.
Figure 4:
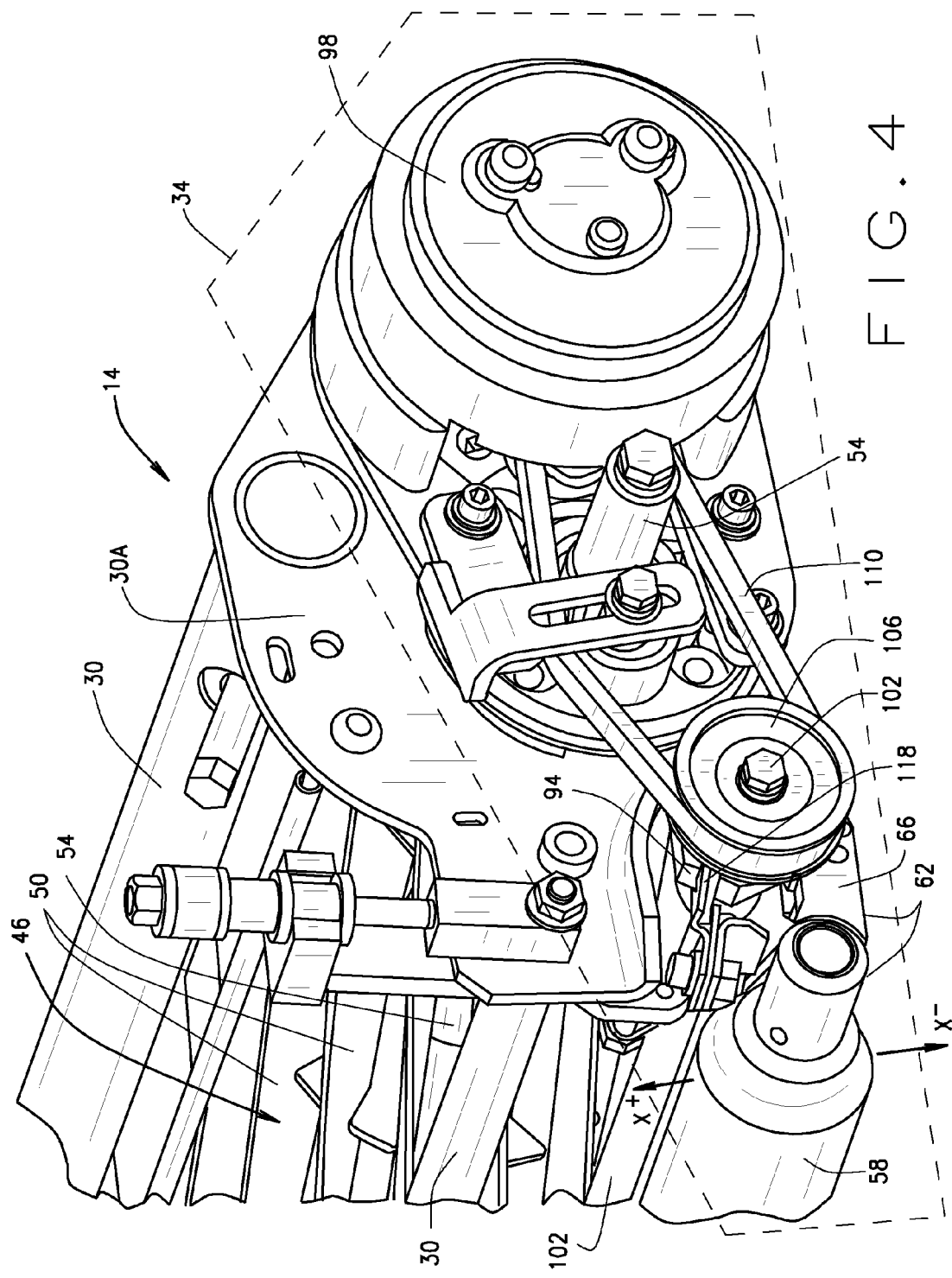
FIG. 4 is an illustration of a portion of the automated height of cut control system shown in FIG. 1, in accordance with various embodiments of the present disclosure.
Figure 5A:
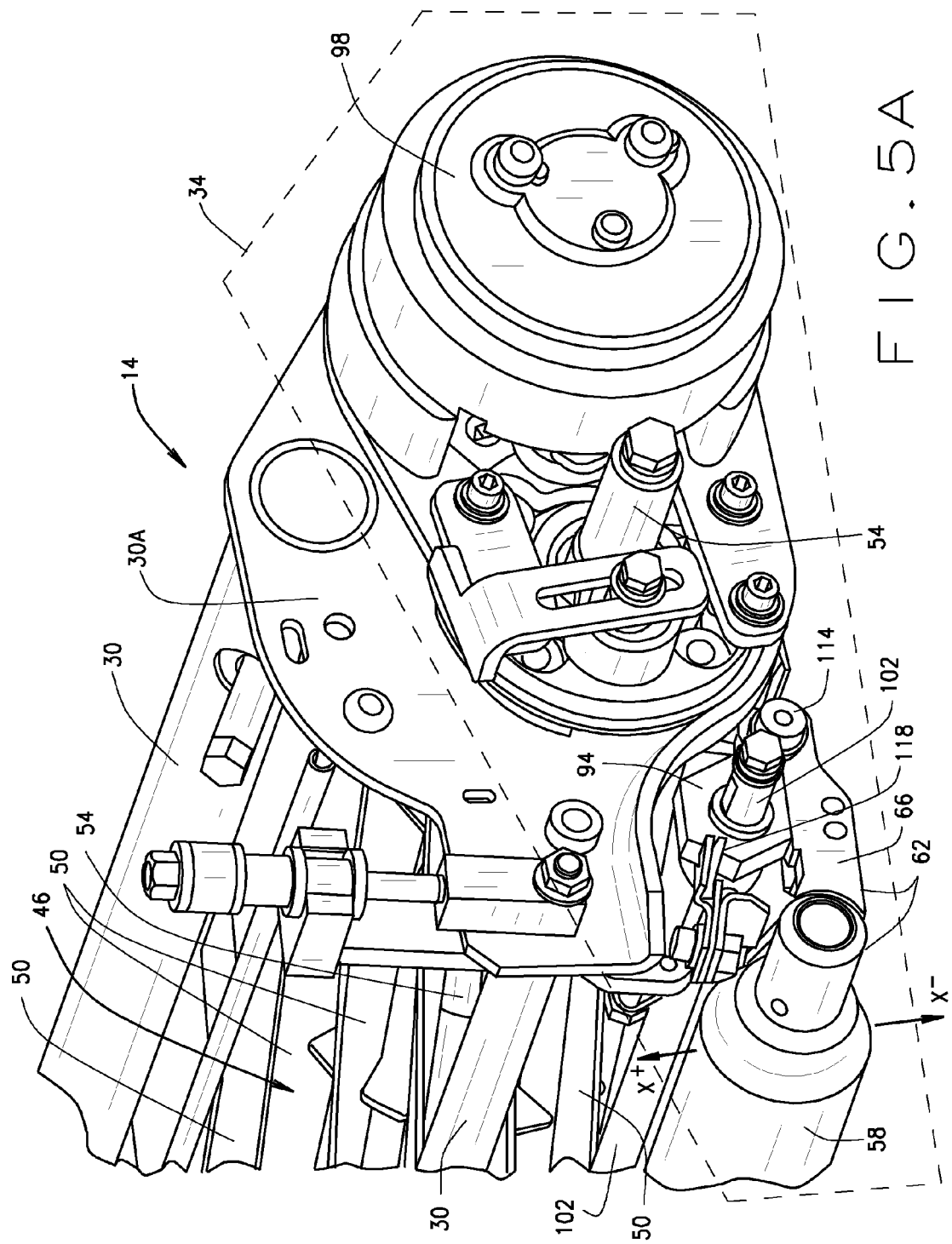
FIG. 5A is an illustration of the portion of the automated height of cut control system shown in FIG. 4 having a cam shaft pulley and cam shaft pulley belt removed to show an eccentric cam in a first position, thereby setting the height of cut of the reel assembly to a first height, in accordance with various embodiments of the present disclosure.
Figure 5B:
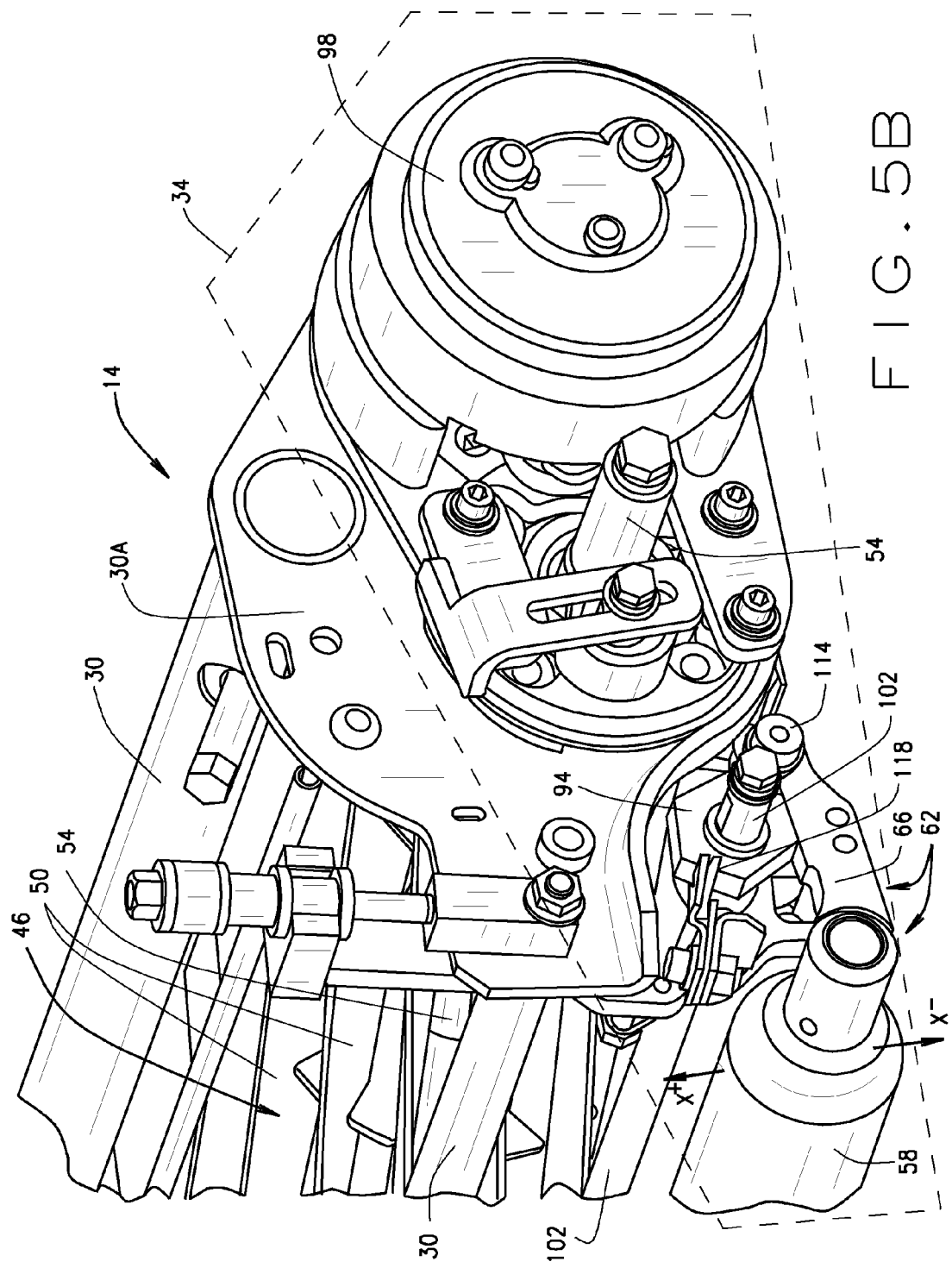
FIG. 5B is an illustration of the portion of the automated height of cut control system shown in FIG. 4 having a cam shaft pulley and cam shaft pulley belt removed to show an eccentric cam in a second position, thereby setting the height of cut of the reel assembly to a second height, in accordance with various embodiments of the present disclosure.

The following description is merely exemplary in nature and is in no way intended to limit the present teachings, application, or uses. Throughout this specification, like reference numerals will be used to refer to like elements.

Referring to FIG. 1, the present disclosure provides a frequency of clip and height of cut control system 10 structured and operable to control a frequency of clip (FoC) and a height of cut (HoC) of a one or more grass cutting reel assemblies 14 of a turf-care vehicle 18. More particularly, the system 10 is structured and operable to automatically set the FoC to a specific frequency, and the HoC to a specific height, based on a selected one of a plurality of cutting scenarios selected by an operator of the vehicle 18 while he/she is onboard the vehicle 18, e.g., while he/she is seated in a seat 22 of vehicle 18.

Referring now to FIGS. 1, 2A, 2B and 3, generally, the system 10 includes one or more reel cylinder motors 26, each mounted to an end plate 30A of a reel frame 30 of a respective reel assembly 14, one or more automated height of cut control systems 34, each mounted to an opposing end plate 30A of the reel frame 30 of a respective reel assembly 14, and a controller system 38 including a user interface 74 that is accessible to the vehicle operator while he/she is onboard the vehicle 18, e.g., seated in the seat 22. Although the vehicle 18 can comprise a plurality of grass cutting reel assemblies 14 (as exemplarily illustrated in FIG. 1), wherein each reel assembly 14 includes a respective reel cylinder motor 26 and a respective automated height of cut control system 34, all of which are comprehensively included in the frequency of clip and height of cut control system 10 and controlled by the controller system 38 (as described below), for simplicity and clarity, the system 10 will be described hereafter with regard to a single reel assembly 14 and the respective reel cylinder motor 26 and automated height of cut control systems 34.

The controller system 38 can comprise one or more control units, as described below. In various embodiments, at least a portion of the controller system 38 can be disposed in an instrument control panel 42 of the vehicle 18. For example, in various embodiments the controller system 38 can comprise a single control unit, as exemplarily illustrated in FIG. 3, that is communicatively connected (wirelessly or via wires) to the reel motor 26 and to the height of cut control system 34 and is operable, as described further below, to control operation of the reel motor 26 and the height of cut control system 34 in accordance with various programmed cutting scenarios that are selectable by the vehicle operator while onboard the vehicle 18, e.g., while seated in the vehicle seat 22. Alternatively, in various embodiments, the controller system 38 can include a plurality of control units comprising a main control unit 38' (exemplarily shown in FIG. 3), that is communicatively connected (wirelessly or via wires) to a reel control unit (not shown), a traction control unit (not shown), and HoC cam motor control unit (not shown), wherein the main control unit 38' communicates cutting scenario commands to the reel, traction and/or cam motor control units, which in turn respectively control operation of the reel motor 26, vehicle speed, and the height of cut control system 34 in accordance with various programmed cutting scenarios.

Importantly, each cutting scenario programmed into the controller, and selectable by the vehicle operator, stipulates that each reel assembly 14 be operated to provide a specific FoC and a specific HoC that has been programmed for a particular cutting surface, e.g., greens, collars, tee-boxes, approaches, fairways, etc. For example, a 'Greens' cutting scenario will stipulate that each reel assembly 14 be operated to provide a specific FoC and a HoC that is programmed into the controller system 38 for use/selection when the operator intends to cut the grass on a golf course putting green. Similarly, a 'Collars', 'Tee-Boxes', 'Approaches', 'Fairways', etc., cutting scenario will stipulate that each reel assembly 14 be operated to provide a specific FoC and a HoC that is programmed into the controller for use/selection when the operator intends to cut the grass on the respective collars, tee-boxes, approaches or fairways of a golf course. Particularly, the controller system 38 is structured and operable to execute one or more cutting scenario programs or algorithms (simply referred to herein as cutting scenario software) that is programmable to enter/set/stipulate the respective FoC and HoC for each cutting scenario via a secure 'Supervisor Mode', whereafter the respective cutting scenarios can be selected by the vehicle operator via an 'Operator Mode' to set the reel unit(s) 14 to the programmed FoC and HoC of the selected cutting scenario.

As described above, the controller system user interface 74 is accessible by the operator while the operator is onboard the vehicle 18, e.g., the controller can be disposed within the vehicle instrument control panel 42. The controller system 38 is generally one or more computer based devices or systems that generally includes at least one electronic storage device 66, one or more processors 70 and other circuitry suitable for storing and executing the cutting scenario software. Each electronic storage device 66 comprises a computer readable medium, such as a hard drive, an ASIC or any other electronic data storage device for storing such things as software packages or programs and algorithms (e.g., the cutting scenario software), digital information, data, look-up tables, spreadsheets and databases. The processor(s) 70 is/are operable to execute the cutting scenario software. The controller system 38 additionally includes the user interface 74 that includes a plurality of cutting scenario selection buttons 78 for selecting a desired cutting scenario. In various implementations the user interface 74 can include a display 82 for viewing such things as information, data and/or graphical representations. Additionally, in various embodiments, the controller system interface 74 can include an I/O (input/output) port 86, e.g., a USB port, structured and operable for connecting an external device to the controller system 38 to download and upload data to and from the electronic memory 66. For example, in various embodiments an external computer device, e.g., a laptop or tablet, can be connected to the controller system 38, via the I/O port 86, to enter the Supervisor Mode in order to program the controller system 38 with the desired FoC and HoC for each cutting scenario. Alternatively, in various embodiments, the controller system 38 can be structured and operable such that the selection buttons 78 can be used enter the Supervisor Mode and program the desired FoC and HoC for each cutting scenario, and also for selecting a specific cutting scenario when the cutting scenario sofeware is in the Operator Mode. In various embodiments, the I/O port 86 can also be used to upload such information as elapsed cutting time for each cutting scenario for the vehicle 18, and other desired vehicle information.

The cylinder motor 26 is mounted to a reel frame end plate 30A and operably connected to a reel cylinder 46 rotatably mounted within the reel frame 30. The reel cylinder 46 comprises a plurality of grass cutting blades 50 helically disposed about a shaft 38 and is rotationally driven by the cylinder motor 26 such that grass will be caught between the rotating cylinder blades 50 and a bedknife blade of the reel assembly 14 (not shown) and cut/clipped during grass cutting operation of the vehicle 18. Particularly, the reel cylinder motor 26, as controlled by the controller system 38 (e.g., by the single unit controller, or the main control unit and the reel control unit), is operated to rotate the reel cylinder 46 at a particular rotational rate of speed (i.e., RPMs) such that, based on the forward speed of the vehicle 18, the grass is cut/clipped at the particular FoC stipulated by the particular selected cutting scenario. In various implementations, the forward speed of the vehicle 18 can also be controlled by the controller system 38 (e.g., by the single unit controller, or the main control unit and the traction control unit). The reel cylinder motor 26 can be any motor suitable for rotating the reel cylinder 46, e.g., an electric or hydraulic motor.

Referring to FIGS. 2A, 2B, 4, 5A and 5B, the reel assembly 14 includes a front roller 58 rotationally disposed within a front roller frame 62. The front roller frame 62 is pivotally connected to the reel frame 30 via a pair of opposing roller frame arms 66 whereby the HoC of the reel assembly 14 can be adjusted/set by changing the position of the front roller 58 relative to the reel cylinder 46. The height of cut control system 34 is structured and operable to automatically control a position of a front roller 58 relative to the reel cylinder 46 in order to automatically control the HoC of the reel assembly 14. More specifically, the controller system 38 is operable to control the height of cut control system 34, as described below, such that the HoC for the reel assembly 14 is automatically adjusted and set to the particular height stipulated by the particular selected cutting scenario.

Referring now to FIGS. 2A, 2B, 4, 5A and 5B, in various embodiments, the HoC control system 34 comprises a pair of eccentric HoC cams 94 rotationally disposed at opposing ends of the reel frame 30 and a cam motor 98 that is operably connected to the cams 94 to control positioning of the cams 94, as described below. Specifically, the cams 94 are fixedly mounted on opposing ends of a cam shaft 102 that is rotationally mounted within the reel frame 30 such that the position of the cams 34 on the shaft 102 are synchronized. Moreover, the cams 34 are fixedly mounted to opposing ends of the cam shaft 102 such that rotation of the cam shaft 102 will rotate and position the cams 34 in synchronization. The cam motor 98 is operably connected to the cam shaft 102 and is structured and operable, as controlled by the controller system 38 (e.g., by the single unit controller, or the main control unit and the cam motor control unit), to rotate the cam shaft 102 and, hence, the cams 94 to position the cams in a particular position to set the HoC of the reel assembly 14 to that stipulated by the particular selected cutting scenario. Specifically, as described below, rotation of the cams 94 by the motor 98 controls the position of the front roller 58 relative to the reel cylinder 46 to thereby control the HoC in accordance with the particular selected cutting scenario. More specifically, rotation of the cams 94 effects the position of the front roller 58, which in turn dictates how high above the ground surface the contact area of the cutting edge of the bedknife blade (not shown) and reel cylinder blades 50 are, which in turn dictates the HoC of the reel assembly 14, whereby the HoC of the reel assembly 14 can be automatically adjusted to that stipulated by the particular selected cutting scenario.

The motor 98 can be any motor suitable for rotating the cam shaft 102 and cams 94. For example, in various embodiments, the motor 98 can be a low profile electric stepper motor. Additionally, the motor 98 can be directly or indirectly operably connected to the cam shaft 102 and cams 94. For example, in various embodiments, a portion of the end of the cam shaft 102 that is adjacent the cam motor 98 extends beyond the respective cam 94 and has a cam shaft pulley 106 fixedly mounted thereon. In such embodiments, the HoC control system further includes a cam shaft pulley belt 110 that operatively connects a drive shaft of the motor 98 (not shown) to the cam shaft pulley 106, and hence to the cam shaft 102 and ultimately to the cams 94. Accordingly, operation of the motor 98, as controlled by the controller system 38 (e.g., by the single unit controller, or the main control unit and the cam motor control unit), will rotate the pulley belt 110, which will in turn rotate the pulley 106 and cam shaft 102, which will in turn rotate the cams 94. Alternatively, the drive shaft of the motor 98 can be directly connected to cam shaft 102 or connected to the cam shaft 102 via gears, a chain or other mechanical linkage.

With further reference to FIGS. 2A, 2B, 4, 5A and 5B, as described above, the front roller 58 of the reel assembly 14 is rotationally disposed within the front roller frame 62, which is pivotally connected to the reel frame 30 via the pair of opposing roller frame arms 66. Particularly, distal ends of the roller frame arms 66 are pivotally connected to the end plates 30A of the reel unit 30 via pivot pins 114, e.g., bolts or press fit pins, such that the front roller 58 can be moved up and down in $X^+$ and $X^-$ directions. It should be noted that FIGS. 5A and 5B exemplarily illustrate the HoC control system 34 without the cam shaft pulley 106 and the pulley belt 110 so that the cams 94 and front roller frame arms 66, and the cooperation therebetween, can be more clearly illustrated. As can be clearly seen in FIGS. 2B, 5A and 5B, the circumferential edge or face of each cams 94 is in substantial face-to-face contact with a top edge or face of the respective one of the roller frame arms 66 such that the synchronous position of the cams 94 will synchronously affect the position of the arms 66, and hence affect the position of the front roller 58 in the $X^+$ and $X^-$ directions.

More particularly, the cams 94 are generally in constant contact with the roller frame arms 66 when the reel assembly 14 is sitting on the ground. As described above, the cams 94 are eccentric, meaning that the cams 94 are mounted eccentrically, i.e., off-center, on the ends of cam shaft 102. Therefore, rotation of the eccentrically mounted cams 94, as controlled by the motor 98 and controller system 38, will cause the radial length of the contact point between the synchronized cams 94 and the roller arms 66 to increase and decrease, whereby the interaction between the cams 94 and the roller frame arms 66, i.e., the contact between the cams 94 and the roller frame arms 66, will cause the roller frame arms 66, and hence the front roller 58, to move up and down in the $X^+$ and $X^-$ directions in accordance with the circumferential shape of the cams 94. One skilled in the art would readily and easily understand that movement of the front roller 58 in the $X^+$ direction, via positioning of the cams 94, will position the reel cylinder 46, and more particularly the reel cylinder blades 50 closer to the ground surface such that the reel assembly 14 will cut the grass to a shorter length, i.e., the HoC will be shorter. Similarly, one skilled in the art would readily and easily understand that movement of the front roller 58 in the $X^-$ direction, via positioning of the cams 94, will position the reel cylinder 46, and more particularly the reel cylinder blades 50 further away from the ground surface such that the reel assembly 14 will cut the grass at a longer length, i.e., the HoC will be higher.

It is envisioned that the eccentric cams 94, i.e., eccentrically mounted cams 94, can have any desirable circumferential shape. For example, the cams 94 can have a triangular, square, hexagonal, octagonal, etc, circumferential shape, whereby the cams 94 will provide a specific number of discrete HoC settings. Specifically, each circumferential face or lobe of the cams 94 will provide a discrete HoC setting. Alternatively, the cams 94 can have a round, elliptical, oval, oblong, etc, circumferential shape, whereby the cams 94 will provide indiscrete variable HoC settings i.e., the HoC settings are not limited to a particular number of predetermined discrete cutting heights, but rather the HoC can be set to any value within a range of values dictated by the respective circumferential shape of the cams 94.

For example, as exemplarily illustrated in FIGS. 2B, 4, 5A and 5B, in various embodiments, the cams 94 have a hexagonal circumferential shape comprising six flat faces or lobes. Therefore, since the cams 94 are eccentrically mounted on the cam shaft 102, each of the six faces/lobes will have a different radial length from a longitudinal axis of the cam shaft 102 to a center point of the respective cam face/lobe, each of the six different radial lengths is related to respective one of six different HoC settings. Accordingly, to set the HoC to a desired one of the six discrete heights, the motor 98 is operated, as controlled by the controller system 38, to rotate the cams 94 such that the cam face/lobe of each cam 94 corresponding to the desired HoC is positioned in flush face-to-face contact with the top edge of the respective roller frame arm 66. This will thereby position the front roller 58 relative to the reel cylinder 46 such that grass will be cut at the desired/selected HoC.

More particularly, in such embodiments, each cutting scenario is programmed to have one of the six discrete HoC setting, via the Supervisor Mode of the cutting scenario software. Thereafter, the cutting scenario software is place in Operator Mode. Subsequently, when the vehicle operator wishes to cut a particular grass surface, e.g., a green, a collar, a tee-box, etc., the operator, while onboard the vehicle 18, selects the desired cutting scenario via the selection buttons 78 of the controller system user interface 74. In response to the selected cutting scenario, the controller operates the motor 98 to rotate the cams 94 such that the face/lobe of the cams 94 that corresponds to the HoC programmed into the selected cutting scenario is positioned in flush face-to-face contact with the top edge of the respective roller frame arm 66, thereby positioning the front roller 58 relative to the reel cylinder 46 such that grass will be cut at the HoC programmed into the cutting scenario software for the selected cutting scenario. For example, FIG. 5A exemplarily illustrated the cams 94 rotated to position one of the six cam faces/lobes having a first (shorter) radial length in face-to-face contact with the top edge roller arms 66 such that the front roller 58 is positioned in closer proximity to the reel cylinder 46 and the HoC is set to a first (shorter) height, as stipulated by the selected cutting scenario, e.g., a 'Greens' cutting scenario. As a further example, FIG. 5B exemplarily illustrated the cams 94 rotated to position one of the six cam faces/lobes having a second (longer) radial length in face-to-face contact with the top edge roller arms 66 such that the front roller 58 is positioned further away from the reel cylinder 46 and the HoC is set to a second (longer) height, as stipulated by the selected cutting scenario, e.g., a 'Tee-Box' cutting scenario.

In addition to the HoC programmed into each cutting scenario, when in Supervisor Mode each cutting scenario of the cutting scenario software can be programmed to have a particular FoC that is desired for the respective cutting scenario. Accordingly, in response to the selected cutting scenario, in addition to setting the front roller 58 to provide the respective programmed HoC, the controller system 38 operates the reel cylinder motor 26 to rotate the reel cylinder 46 at a particular rate of rotational speed (based on the speed of the vehicle 18) to provide the respective programmed FoC for the reel assembly 14.

As described above, the FoC and HoC for each cutting scenario can be programmed into the cutting scenario software via the secure Supervisor Mode. As also described above, the Supervisor Mode can be accessed by an authorized user (i.e., a Supervisor) using an external device connected to the I/O port 86 of the controller system user interface 74, or alternatively via a particular sequence of depressions of the selection buttons 78, i.e., via entrance of a password. Once the Supervisor Mode has been entered the authorized user can set the particular FoC and HoC for each cutting scenario using the respective handheld device and/or the selection buttons 78. After the FoC and HoC for each cutting scenario has been programmed, the authorized user exits the Supervisor Mode, whereafter the controller system 38 is set to, or defaults to, the Operator Mode. In the Operator Mode, the programming access to the cutting scenario software is blocked and the only input to the cutting scenario software that is allowed is selection of a desired cutting scenario using the selection buttons 78. As described above, in various embodiments, one or more components of the controller system 38 can be disposed in the vehicle instrument control panels. Alternatively, in various other embodiments, one or more components of the controller system 38 can be disposed elsewhere on the vehicle. But importantly, in all embodiments, the selection buttons 78 are accessible to the vehicle operator while the operator is onboard the vehicle 19, i.e., seated in the seat 22.

For example, the selections buttons 78 can be part of the controller system user interface 74 mounted in the instrument panel 42 (as described above), or the selection buttons 78 can be disposed in the instrument control panel 42 and communicatively connected (via wires or wirelessly) to the one or more components of the controller system 38 that is/are located elsewhere on the vehicle 38, or the selection buttons 78 can be located in any other convenient operator accessible location on the vehicle 18 and communicatively connected (via wires or wirelessly) to the controller system 38. Importantly, in all embodiments the operator can select and automatically set the FoC and the HoC of each reel assembly 14 while onboard the vehicle 18, i.e., without dismounting the vehicle 18, by merely selecting a desired cutting scenario using the selection buttons 78. In various implementations, each selection button 78 is operable to select a corresponding one of the plurality of programmed cutting scenarios, such that a single depression of one of the selection buttons 78 selects and initiates the respective cutting scenario. That is, selection of a desired cutting scenario and the resulting automated setting of the FoC and HoC for the selected cutting scenario is a One-Touch process.

Still referring to FIGS. 2A, 2B, 4, 5A and 5B, in various embodiments, the HoC control system 34 can further comprise a pair of cam scrapers 118 that are mounted to the reel cylinder frame 30, e.g., mounted to the reel cylinder frame end plates 30A and are structured and operable to remove debris from the cams 94 upon rotation of the cams 94.

Particularly, the cam scrapers 118 are mounted to the reel cylinder frame 30 and contact the cams 94 in such a manner so as to not impede rotation of the cams 34, but to scrape off, dislodge or remove debris such as grass clippings, dirt and mud from the cams 94, particularly from the circumferential face(s) of the cams 94. For example, in various embodiments, the cam scrapers 118 can be brushes or flexible plates that contact the circumferential face(s) of the cams 94 such that debris is removed from the cams 94 but rotation and positioning of the cams 94 in accordance with a selected cutting scenario, as described above, is not impeded.

Additionally, in various embodiments, the HoC control system 34 can further comprise a height sensor 122 (shown in FIG. 2B) for verifying that the HoC set via execution of the cutting scenario, as described above, is accurate in accordance with the HoC programmed into the selected cutting scenario. Particularly, the height sensor 122 provides feedback to the controller system 38 regarding the rotation position of the cams 94 to verify that the HoC set via execution of the cutting scenario is accurate in accordance with the HoC programmed into the selected cutting scenario.

It is envisioned that the FoC and HoC control system 10 can be operable to universally set each reel assembly 14 of the vehicle 18 to the same programmed FoC and HoC for a given selected cutting scenario. Or, it is further envisioned that the FoC and HoC control system 10 can be operable to automatically set each individual reel assembly 14 of the vehicle 18 to an independent and different FoC and/or HoC for a given selected cutting scenario. For example, if a 'Greens' cutting scenario is selected, the cutting scenario software can be programmed and operable to operate a radially inward reel assembly 14 (radially inward with reference to the center of the green) at slower FoC than a radially outward reel assembly 14 (with reference to the center of the green) of the vehicle 18.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A control system for a grass cutting reel assembly of a turf-care vehicle, said system comprising:
a reel cylinder motor structured and operable to rotate a reel cylinder of a grass cutting reel assembly of a turf-care vehicle at a desired rotational rate of speed that is based on the terrestrial speed of the vehicle to provide a controllable frequency of clip for the reel assembly;
an automated height of cut control system structured and operable to control a position of a front roller of the grass cutting reel assembly to provide a controllable height of cut for the reel assembly, wherein the automated height of cut control system comprises:
a cam shaft rotationally mounted within a reel frame of the grass cutting reel assembly; and
a pair of eccentric cams mounted to opposing ends of the cam shaft and structured and operable to interact with a front roller frame pivotally connected to the reel frame and having the front roller rotationally disposed therein, such that rotation of the cams will controllably move the front roller frame and thereby control a position of the front roller relative to the reel cylinder and thereby control the height of cut; and
a controller system structured and operable to, via a one-touch process, control the reel cylinder motor and the height of cut control system in accordance with a selected one of a plurality of cutting scenarios, selected via the one-touch process, wherein each cutting scenario stipulates both a particular frequency of clip and a corresponding particular height of cut to be implemented by the reel assembly, each cutting scenario programmed into the controller system and selected via the one-touch process using a user interface of the controller system that is accessible by an operator onboard the turf-care vehicle.

2. The system of claim 1, wherein the height of cut control system further comprises
a cam motor communicatively connected to the controller system and operably connected to the cams, the cam motor structured and operable to rotate the cams to move the front roller frame to adjust the position of the front roller to set the height of cut to the particular height stipulated by the selected cutting scenario.

3. The system of claim 2 further comprising a height sensor communicatively connected to the controller system and operably connected to the cams, the height sensor structured and operable to measure a rotational position of the cams.

4. The system of claim 2, wherein the eccentric cams comprise a plurality of flat faces such that rotation of the cams provides a plurality of discrete height of cut heights.

5. The system of claim 2, wherein the height of cut control system further comprises a pair of cam scrapers that are structured and operable to remove debris from the cams upon rotation of the cams.

6. The system of claim 1, wherein the user interface comprises a plurality of selection inputs, each input structured and operable to select a corresponding one of the plurality of programmed cutting scenarios.

7. A control system for a grass cutting reel assembly of a turf-care vehicle, said system comprising:
a reel cylinder rotationally disposed within a reel frame of the reel assembly;
a cam shaft rotationally mounted within the reel frame;
a front roller rotationally disposed within a front roller frame of the reel assembly, the front roller frame pivotally connected to the reel frame such that a height of cut of the reel assembly can be adjusted by moving the front roller frame and thereby changing a position of the front roller relative to the reel cylinder; and
a frequency of clip and height of cut control system comprising:
a reel cylinder motor structured and operable to rotate the reel cylinder at a desired rotational rate of speed that is based on the terrestrial speed of the vehicle to provide a controllable frequency of clip for the reel assembly;
an automated height of cut control system structured and operable to control a position of the front roller to provide a controllable height of cut for the reel assembly, the automated height of cut control system comprising:
a pair of eccentric cams mounted to opposing ends of the cam shaft and structured and operable to interact with the front roller frame such that rotation of the cams will controllably move the front roller frame and thereby control the position of the front roller relative to the reel cylinder and thereby control the height of cut; and
a cam motor communicatively connected to the controller system and operably connected to the cams, the cam motor structured and operable to rotate the cams to move the front roller frame to adjust the position of the front roller to set the height of cut; and a controller system structured and operable to control the reel cylinder motor and the cam motor in accordance with a selected one of a plurality of cutting scenarios, wherein each cutting scenario stipulates a particular frequency of clip and a corresponding particular height of cut to be implemented by the reel assembly, each cutting scenario programmed into the controller system and selected via a user interface of the controller system that is accessible by an operator onboard the turf-care vehicle.

8. The system of claim 7 further comprising a height sensor communicatively connected to the controller system and operably connected to the cams, the height sensor structured and operable to measure a rotational position of the cams.

9. The system of claim 7, wherein the height of cut control system further comprises:
a pulley operatively connected to cams; and
a pulley belt operatively connected to the pulley and the cam motor such that rotation of the cam motor rotates the pulley and the cams to set the height of cut to the particular height of cut stipulated by the selected one of the plurality of cutting scenarios.

10. The system of claim 7, wherein the eccentric cams comprise a plurality of flat faces such that rotation of the cams provides a plurality of discrete height of cut heights.

11. The system of claim 7, wherein the height of cut control system further comprises a pair of cam scrapers that are structured and operable to remove debris from the cams upon rotation of the cams.

12. The system of claim 7, wherein the user interface comprises a plurality of selection inputs, each input structured and operable to select a corresponding one of the plurality of programmed cutting scenarios.

13. A turf-care vehicle, said vehicle comprising:
an operator seat in which a vehicle operator can sit during operation of the vehicle;
an instrument control panel accessible by the operation while sitting in the seat; and
at least one grass cutting reel assembly, each grass cutting reel assembly comprising:
a reel cylinder rotationally disposed within a reel frame of the reel assembly;
a front roller rotationally disposed with a front roller frame of the reel assembly, the front roller frame pivotally connected to the reel frame such that a height of cut of the reel assembly can be adjusted by changing the position of the front roller relative to the reel cylinder; and
a frequency of clip and height of cut control system comprising:
a reel cylinder motor structured and operable to rotate the reel cylinder at a desired rotational rate of speed that is based on the terrestrial speed of the vehicle to provide a controllable frequency of clip for the reel assembly;
an automated height of cut control system structured and operable to control a position of the front roller to provide a controllable height of cut for the reel assembly, wherein the automated height of cut control system comprises:
a cam shaft rotationally mounted within a reel frame of the grass cutting reel assembly; and
a pair of eccentric cams mounted to opposing ends of the cam shaft and structured and operable to interact with a front roller frame pivotally connected to the reel frame and having the front roller rotationally disposed therein, such that rotation of the cams will controllably move the front roller frame and thereby control a position of the front roller relative to the reel cylinder and thereby control the height of cut; and
a controller system structured and operable, via a one-touch process, to control the reel cylinder motor and the height of cut control system in accordance with a selected one of a plurality of cutting scenarios, selected via the one-touch process, wherein each cutting scenario stipulates both a particular frequency of clip and a corresponding particular height of cut to be implemented by the reel assembly, each cutting scenarios programmed into the controller system and selected via the one-touch process using a user interface of the controller system disposed within the instrument control panel that is accessible by the operator while sitting in the seat.

14. The system of claim 13, wherein the height of cut control system further comprises
a cam motor communicatively connected to the controller system and operably connected to the cams, the cam motor structured and operable to rotate the cams to move the front roller frame to adjust the position of the front roller to set the height of cut to the particular height stipulated by the selected cutting scenario.

15. The system of claim 14 further comprising a height sensor communicatively connected to the controller system and operably connected to the cams, the height sensor structured and operable to measure a rotational position of the cams.

16. The system of claim 14, wherein the eccentric cams comprise a plurality of flat faces such that rotation of the cams provides a plurality of discrete height of cut heights.

17. The system of claim 14, wherein the height of cut control system further comprises a pair of cam scrapers that are structured and operable to remove debris from the cams upon rotation of the cams.

18. The system of claim 13, wherein the user interface comprises a plurality of selection inputs, each input structured and operable to select a corresponding one of the plurality of programmed cutting scenarios.

19. A control system for a grass cutting reel assembly of a turf-care vehicle, said system comprising:
an automated height of cut control system structured and operable to control a position of a front roller of a grass cutting reel assembly of a turf-care vehicle to provide a controllable height of cut for the reel assembly, the automated height of cut control system comprising:
a cam shaft rotationally mounted within a reel frame of the grass cutting reel assembly; and
a pair of eccentric cams mounted to opposing ends of the cam shaft and structured and operable to interact with a front roller frame pivotally connected to the reel frame and having the front roller rotationally disposed therein, such that rotation of the cams will controllably move the front roller frame and thereby control a position of the front roller relative to a reel cylinder of the grass cutting reel assembly and thereby control the height of cut such that rotation of the cams provides a plurality height of cut heights;

a controller system structured and operable to control the height of cut control system in accordance with a selected one of a plurality of cutting scenarios, wherein each cutting scenario stipulates a particular height of cut to be implemented by the reel assembly.

* * * * *